Dec. 24, 1968     M. INGRAM     3,418,566
PROBE FOR MEASURING CONDUCTIVITY
OF AN ELECTROLYTE SOLUTION
Filed March 10, 1966
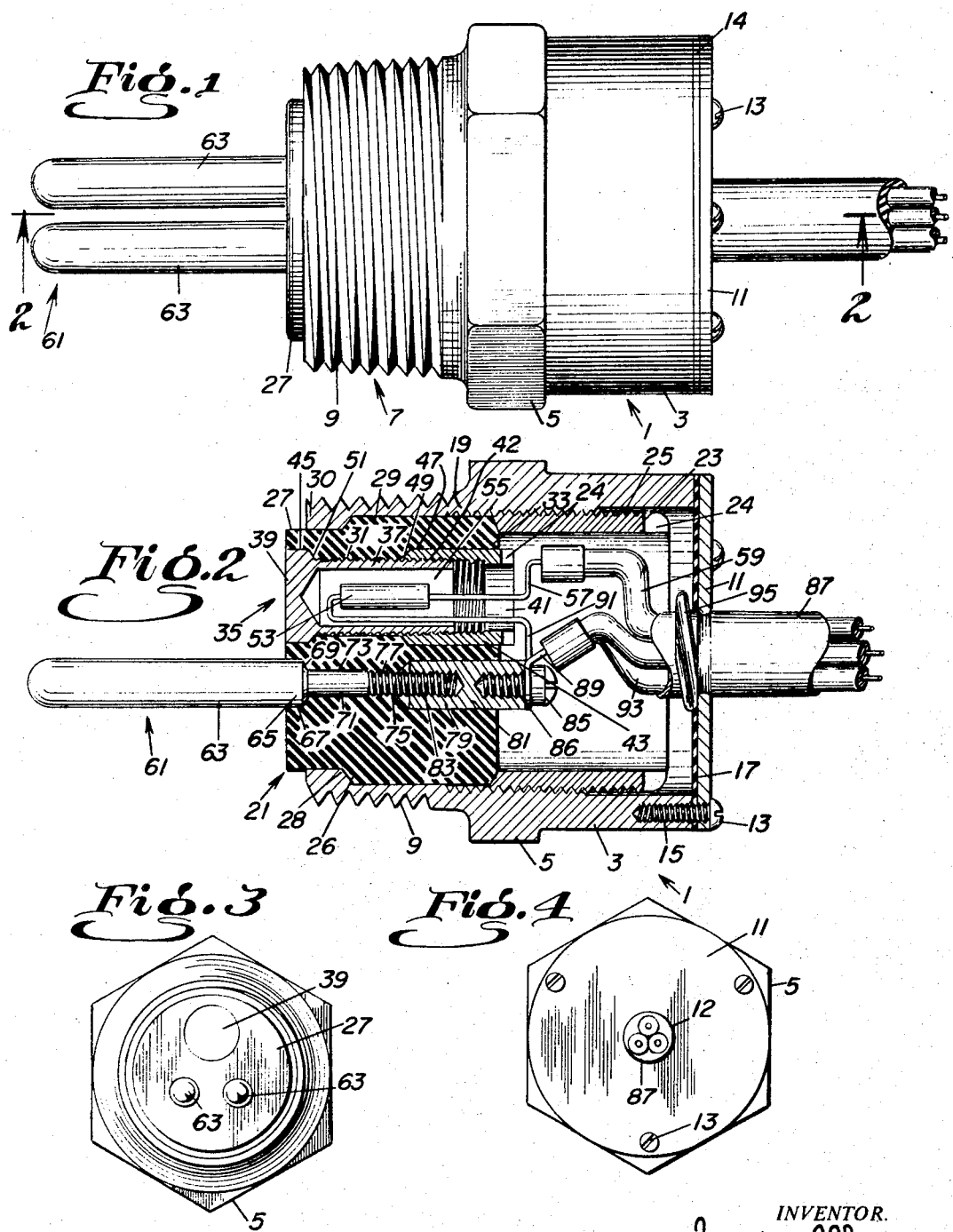
INVENTOR.
Maxwell Ingram
BY
Peck + Peck

United States Patent Office 3,418,566
Patented Dec. 24, 1968

3,418,566
PROBE FOR MEASURING CONDUCTIVITY
OF AN ELECTROLYTE SOLUTION
Maxwell Ingram, 15 Hamilton Ave.,
Dumont, N.J. 07628
Filed Mar. 10, 1966, Ser. No. 533,195
7 Claims. (Cl. 324—30)

ABSTRACT OF THE DISCLOSURE

A probe for measuring conductivity of an electrolyte solution. A housing, an electric and thermal insulating core mounted therein. Electrodes mounted in and extending from the core, an automatic temperature compensator mounted entirely within the core in spaced relation to the electrodes and an automatic temperature compensator mounted therein, the elements of the probe being independently removable from the probe.

---

In the following description of this invention, wherein the invention is described as being a conductivity cell, or conductivity cell assembly, it is to be fully understood that this described conductivity cell assembly is the equivalent of the same as a probe for measuring conductivity of an electrolyte solution.

This invention relates broadly to a conductivity cell, and in its more specific aspects, it relates to such a conductivity measuring cell provided with a pair of electrodes which are positioned within an electrolyte or other type of solution for measuring the conductivity thereof; and the nature and objects of the invention will be readily recognized and understood by those skilled in the arts to which it relates in the light of the following explanation and detailed description of the accompanying drawings illustrating what I at present believe to be preferred embodiments or mechanical expressions of my invention from among various other forms, arrangements, combinations and constructions, of which the invention is capable within the spirit and scope thereof.

This invention consists generally of a relatively simple and inexpensively produced conductivity cell assembly, which includes a pair of spaced apart electrodes which project from the main body of the assembly and are adapted to be inserted within a solution to be measured, so that the solution may flow around and between the electrodes to measure the conductivity of the solution. An alternating electric current is connected to the electrodes.

While I am aware that there are a substantial number of various types of conductivity cells which are now in commercial use, it has been one of my purposes in devising this conductivity cell to provide such a cell assembly which may be readily inserted into or withdrawn from a piping system in which the solution, the conductivity of which is to be measured, flows, and such insertion and withdrawal may be accomplished in a manner which is substantially easier and more expeditious than those of the prior art, for my assembly may be inserted into or withdrawn from the piping system with or without the application of liquid shut-off valves.

It is conventional practice in conductivity cells to incorporate therein an automatic temperature compensator, and in such prior assemblies of which I have knowledge, such automatic temperature compensator is mounted within one of the electrodes. It will be readily obvious to one skilled in this art that such prior art constructions have many inherent disadvantages for instance, if the automatic temperature compensator needs replacing, it is necessary to remove the electrode in which it is mounted from the assembly for the removal therefrom of the damaged temperature compensator and the insertion of a new one therein, or the entire electrode and compensator may have to be replaced. This is a time consuming operation and also involves certain other disadvantages.

In the conductivity cell of this invention, the automatic electric compensator, or thermistor, is mounted in the cell separately and independently of the electrodes, and, as I have stated, the compensator is not mounted in one of the electrodes in the conventional manner. In my invention, the automatic temperature compensator is mounted within a housing, and this housing is not combined or incorporated into an electrode, and it is thermally insulated from the electrodes, and is not electrically integrally connected to either one of the electrodes, nor does the compensator assembly involve an electrical connection between the compensator and the housing in which it is mounted. Thus, the compensator, or thermistor, is completely independent electrically from the housing in which it is mounted. The housing for the compensator functions only for thermal conduction and to prevent any solution, or other liquid, from reaching it to electrically short circuit it. The compensator housing, since it is not an electrode, or in any manner connected with it, does not require any special precious metal or covering.

I have mounted the automatic temperature compensator in the assembly so that it does not interfere electrically or mechanically with the measuring system, but it is so located within the assembly that it is in thermal contact with the liquid solution being measured so that the temperature of the solution is readily and accurately transmitted to the temperature compensator so that electric changes are affected to nullify the effect of temperature as rapidly as possible.

Not only have I mounted the temperature compensator in the cell assembly as generally set forth above, but I have also so arranged and mounted this temperature compensator unit within the assembly so that it may be easily and readily removed therefrom for replacement or repair. In effect, I have so designed this assembly that not only the compensator is in effect an independent unit, but I have also arranged the various other elements of the assembly so that they are independent units and may be readily and easily removed from the assembly and new ones inserted therein.

As will become apparent as this description proceeds, I have so designed the cell assembly that any one or all of its parts may be independently, promptly and easily removed and replaced in the event of damage, corrosion or wearing out. Thus, this arrangement and construction makes it possible to provide the equivalent of a new conductivity cell if a part or parts thereof cease functioning, without the expense or the need to provide an entirely new cell. It is also significant in my construction that all of these independently removable and replaceable parts are interchangeable and provide accurate calibration readings when replaced.

One of the significant features and characteristics of this conductivity cell resides in the fact that it may be manufactured at relatively minimum expense for low priced applications. Thus, while I have incorporated in my cell the aforesaid and other advantageous features, I have not sacrificed economy in production.

The conductivity cell of this invention is particularly adapted for placement directly into a piping system as a complete integral unit and with or without the application of any additional equipment, such as valves and the like. While the conductivity cell finds particular use in applications where there is no hardship in turning off the solution supply so that the integral unit may be inserted or removed, it is not my intention to confine this integral conductivity cell assembly to such applications for an extension of the cell can be made so that it may be used in conjunction with an automatic shut-off valve as with any other type cell which may be used. To accomplish this, it is merely necessary to change the outside configuration of the body of the conductivity cell, and to lengthen it to accommodate the particular valve which may be employed. It is also within my contemplation to use this conductivity cell in a bypass piping system with auxiliary shut-off valves placed on either side of the cell.

With the foregoing general objects, features and results in view, as well as certain others which will be apparent from the following explanation, the invention consists in certain novel features in design, construction, mounting and combination of elements, as will be more fully and particularly referred to and specified hereinafter.

Referring to the accompanying drawings:

FIG. 1 is a top plan view of the conductivity cell unit.
FIG. 2 is a view taken on line 2—2 of FIG. 1.
FIG. 3 is a front view in elevation of the conductivity cell unit.
FIG. 4 is a rear view in elevation of the conductivity cell assembly.

In the accompanying drawings, I have used the numeral 1 to designate in its entirety the conductivity cell housing which houses, contains and mounts all of the elements which form parts of this cell assembly, which I have designed to measure the conductivity of a solution or liquid which is under test. The housing 1 is preferably, though not necessarily, formed of bronze. The housing 1 is of generally cylindrical shape and is open at its front and rear ends, the rear end thereof being closeable in a manner which I shall describe hereinafter. The cell housing is provided with a rear body 3, at the forward exterior end of which is a hexagon 5 between flats which is employed to facilitate the use of a wrench in threading the conductivity cell into a piping system, as will be explained. The conductivity cell housing 1 also includes a forward end which I have designated generally by the numeral 7, such forward end being forwardly disposed relative to the hexagon, and this forward end of the housing is externally threaded as at 9, and is of forwardly and inwardly tapering construction, as is clearly illustrated in the drawings. It will now be appreciated that the housing 1, with its elements operatively mounted therein, as will be described, is adapted to be screwed into a piping system or the like, the conductivity of the solution or liquid which is to be measured. The threaded forward end 7 which is screwed into the pipe or the like of the system, ensures a watertight seal due to the taper of the threads and thus, no leakage pressure is lost past the threads.

The rear end of the housing 1 is closed by means of a plate 11 which is removably mounted on the rear annular edge of the housing by means of a series of screws 13 which are threaded into the rear edge of the housing as at 15. I provide a rubber or the like gasket seal 17 which is secured in fixed position between the cap plate 11 and the rear annular edge of the housing 1. The arrangement of the cap plate 11 and the gasket 17 provides a watertight seal at the rear end of the housing to prevent any water, etc. from entering the housing from the rear end.

Centrally of the cap plate 11, I provide an annular aperture through which the electric cables extend and enter the cell, as I shall hereinafter explain.

The housing 1 is internally threaded as at 19 along a portion of the rear end thereof, as well as along a portion underlying the hexagonal surface 5. An insulator designated in its entirety by the numeral 21 is mounted within the housing, and this insulator is preferably made of Kel-F plastic or the equivalent thereof, or any material which has high insulation and no water absorption characteristics, and withstands high temperatures and pressures which may be in a water or the like system, and has substantially zero thermal conductivity characteristics. I utilize an inside screw 23, which is of tubular configuration of a diameter slightly less than the I.D. of the housing 1, and the inside screw is externally threaded as at 25, and when this inside screw is in operative position, it is threaded onto the screws 19 with its forward end in engagement with the rear end of the insulator core 21 to maintain it in operative position within the housing. The inside screw is provided with four slots 24 to provide for its tightening and loosening within the housing. With the insulator core 21 positioned within the housing, it is maintained therein by screwing the inside screw into the housing until the forward edge thereof abuts and engages and presses against the rear end of the insulator core to force the forward tapered surface 26 against the tapered shoulder 28 which is formed in the housing 1. This tapered fit provides a sound watertight seal between the housing and the insulator core.

When the insulator core is mounted and maintained within the housing as described, it is preferable that a portion 27 thereof project forwardly a slight distance beyond the forward end 30 of the housing 1, as is clearly illustrated in the drawings.

The insulator 21 provides a body portion 29, which, as will become apparent as this description proceeds, is drilled or otherwise formed to provide several openings or pockets which seat and mount the various operating elements of the conductivity cell assembly.

The body portion 29 of the insulator 21 is drilled to provide a circular opening 31 extending from and through the forward part 27 to and through the rear part of the body portion 29, so that a circular hole is provided extending from and through the front of the body portion 29 to and through the rear portion 33 thereof. The circular opening 31 in the body portion 29 supports and mounts the automatic temperature compensating device or thermistor and the housing therefor, which I have designated generally by the numeral 35. The automatic temperature compensating device 35 comprises a housing 37 closed at its front end as at 39 and open at its rear end as at 41. The housing 37 for the automatic temperature compensator may be made of brass or bronze or any other suitable thermal material having good thermal conductivity characteristics. It will be noticed, and it is significant that the automatic temperature compensator housing 37 has its front end 39 flush with the front end of the insulator core 21.

As will be apparent from the drawings, the brass or bronze automatic temperature compensator housing 37 is externally threaded at and forwardly a distance from its rear end as at 42, and I provide an internally threaded nut 43 which threads on the external thread 42 of the housing 37 to maintain it in position within the circular opening 31 in the insulator core 21. Slots 44 are provided on nut 43 for screwing and unscrewing this nut. Consideration of the drawings discloses that the opening 31 in the insulator in which is positioned the automatic temperature compensator housing 37 is flared at its forward end as at 45 so that the forward portion 39 of the housing 37 may be diametrically enlarged to provide a substantial surface for thermal contact with the solution under test. The circular opening 31 at its rear end and forwardly a distance therefrom is enlarged as at 47 to accommodate the nut 43, the tapered shoulder 49 against which the forward tapered end of the nut engages maintains the housing 37 against forward movement out of the cell, while the shoulder 51 maintains the housing 37 against rearward movement, and these tapered shoulders provide an excellent sealing arrangements.

Mounted within the housing 37 is an automatic temperature compensator or thermistor 53, and this compensator is mounted and insulated centrally of the housing 37, preferably in an epoxy potting or the like 55.

I have used the numeral 57 to designate a connecting wire enclosed within a Teflon or the like sleeve, which connects the automatic temperature compensator or thermistor 53 into the electrical system by means of a further housing enclosed wire 59 of a three wire cable system 87.

The conductivity cell includes a pair of electrodes, designated generally by the numeral 61, which are mounted within the cell in a manner to be explained and project therefrom for insertion into a solution which may be flowing in a piping system, or in a solution which may be in any other condition where the conductivity of such solution is desired to be measured. These projecting electrodes which are spaced apart, are cylindrical in configuration and may be made of solid Monel or stainless steel, or the like, with a plate or sheathing of gold, rhodium, platinum, palladium or other noble metal. The cell constant of the conductivity cell is determined by the length of the electrodes, the diameter thereof and the spacing of the electrodes, so that these various characteristics of the electrodes are pre-determined so that the conductivity cell will have the required cell constant.

Each electrode comprises a cylindrical projecting portion 63 which is adapted to project into the solution to be tested so that such solution may flow around and between the pair of electrodes. This projecting portion 63 of each electrode is of cylindrical configuration and the inner end 65 thereof projects into a threaded hole 67 in the insulator 21, and this rear portion of each electrode body portion 65 at its rear end has a taper 69 on the order of 30° which bears and presses against a corresponding taper which is formed in the body portion 29 of the insulator. This arrangement provides a good watertight seal. Projecting rearwardly from the rear end 65 of the body portion 63 of each electrode is a reduced diameter stem 71 which seats in a drilled opening 73 in the insulator 21, and an externally threaded rearwardly projecting length 75 projects from the rear end of the reduced diameter portion 71, such externally threaded length 75 extending into a drilled opening 77 in the insulator. Rearwardly of the opening 77, and in communication therewith, the insulator is drilled to provide a larger diameter opening 79 into which the externally threaded stem 75 extends. I provide a terminal nut 81 having an opening in its inner end which is internally threaded as at 83 and threadedly receives therein the threaded length 75 of the electrode. The terminal nut 81 extends rearwardly beyond the body portion 29 of the insulator and has an internally threaded opening at its rear end for receiving a screw 85, the purpose of which will be hereinafter explained.

It should be noted that the nut 81 has its forward end tapered, and this taper is tightly fitted against a corresponding taper in the insulator to effect a good watertight seal. Also the threads in the nut are blind threads so that in the event any water or the like creeps up in through the threads, it would not flow into the back space of the housing and cause a short circuit.

The two electrodes 61 and the temperature compensator means 53 are electrically connected to a suitable indicating system (not shown) through the medium of a three-way cable 87 in the following manner:

One wire 89 of the three-way cable is connected to one of the electrodes by means of the screw 85 and terminal lug 86, the terminal nut 81, the threaded stem 83 and the stem 71. The wire 57 which is connected to the wire 59 of the three-way cable is connected to one end of the thermistor 53, and by means of the wire 91, the other end of the thermistor is electrically connected to one of the electrodes. The third wire 93 of the three-way cable is connected to the other electrode as will be apparent to one skilled in this art.

The three wire cable system enters the conductivity cell through the aperture 12 in the cap plate 11. The opening or aperture 12 has rounded off ends, and the diameter of the opening is less than the diameter of the rubber or sheathing around the cables 87 so that when the cables and sheath are forced through the opening, they are always under compression which makes a good watertight seal to prevent any contaminant or any drippings from entering through the rear end of the cell. I provide a strain relief wire 95 to prevent the wires from accidentally being pulled out of the cell assembly. The wire 95 is embedded into the sheath about the three wire system and is forced against the cap plate to prevent any movement of the cable system.

I claim:
1. A probe for measuring conductivity of an electrolyte solution adapted to measure the conductivity of a solution, including in combination, a housing, an insulating core mounted in said housing, a pair of spaced apart electrodes mounted in said core and projecting from said core and housing and adapted to extend into the solution, and an automatic temperature compensator mounted entirely within said core and surrounded thereby and in spaced relation with respect to each of said electrodes, and said automatic temperature compensator being discrete electrically and thermally insulated from each of said electrodes.

2. A probe for measuring conductivity of an electrolyte solution in accordance with claim 1, wherein an automatic temperature compensator housing is mounted within said core and surrounded thereby, and said automatic temperature compensator is mounted in said automatic temperature housing, and said automatic temperature compensator housing is remote from said electrodes and is insulated thermally therefrom and is electrically discrete therefrom.

3. A probe for measuring conductivity of an electrolyte solution in accordance with claim 2, wherein said automatic temperature compensator housing is formed of a material having thermal conductivity characteristics, and a portion only thereof is in contact with the solution, the conductivity of which is being measured.

4. A probe for measuring conductivity of an electrolyte solution in accordance with claim 2 wherein said first named housing is provided with an open forward end and a rear end, removable means is provided for closing and sealing the rear end thereof, threaded means on said housing adapted to removably insert it in a system containing the solution, the conductivity of which is being measured, said automatic temperature compensator housing and said electrodes being independently removable from and insertable into the insulating core, and means for removably maintaining said automatic temperature compensator housing and said electrodes in said insulating core.

5. A probe for measuring conductivity of an electrolyte solution in accordance with claim 4, wherein electric leads are provided and are connected to said automatic temperature compensator and said electrodes, and said removable means is provided with an access opening for insertion of said electric leads.

6. A probe for measuring conductivity of an electrolyte solution in accordance with claim 5, wherein said automatic temperature compensator housing is formed of a material having thermal conductivity characteristics and is provided with a closed forward end and an open rear end, and said closed forward end is in contact with the solution, the conductivity of which is being measured, and said electric leads extend through the rear open end.

7. A probe for measuring conductivity of an electrolyte solution, adapted to measure the conductivity of a solution, including in combination, a housing, an insulating core of generally cylindrical configuration mounted in said housing, a pair of spaced apart electrodes mounted in said core and projecting from said core and housing and adapted to extend into the solution, an automatic temperature compensator housing mounted in said core and surrounded thereby, an automatic temperature compensator mounted in said automatic temperature compensator housing, and said insulating core is provided with a pair of spaced apart openings for mountedly receiving the electrodes and with a further opening radially spaced from said pair of openings for mountedly receiving the automatic temperature compensator housing, and each of said electrodes being removably mounted in said pair of spaced apart openings and independently removable therefrom with respect to each other and to said automatic temperature housing, and said automatic temperature compensator housing being removably mounted in said further opening and being removable therefrom independently of each of said electrodes.

References Cited

UNITED STATES PATENTS

| | | | |
|---|---|---|---|
| 1,670,640 | 5/1928 | Smith | 324—30 |
| 2,328,853 | 9/1943 | Sherrard. | |
| 2,330,394 | 9/1943 | Stuart | 324—30 X |
| 2,450,459 | 10/1948 | Thomson | 324—30 |
| 2,505,936 | 5/1950 | Behn | 324—30 |
| 2,621,235 | 12/1952 | Jewell | 324—30 |
| 2,922,105 | 1/1960 | Estelle | 324—30 |
| 3,302,102 | 1/1967 | Lace | 324—30 |

RUDOLPH V. ROUNEC, *Primary Examiner.*

C. F. ROBERTS, *Assistant Examiner.*